(12) United States Patent
Christman

(10) Patent No.: US 6,386,194 B1
(45) Date of Patent: May 14, 2002

(54) FIREPLACE AND OUTSIDE-LOADING LOG BOX

(76) Inventor: Roger C. Christman, 12451 Wendell Holmes Rd., Herndon, VA (US) 20171-2460

( * ) Notice: Subject to any disclaimer, the term of this patent is extended or adjusted under 35 U.S.C. 154(b) by 21 days.

(21) Appl. No.: 09/667,635

(22) Filed: Sep. 22, 2000

(51) Int. Cl.⁷ .................................................. F24B 1/18
(52) U.S. Cl. ........................ 126/500; 126/283; 52/36.3; 232/43.4
(58) Field of Search ............................... 126/500, 510, 126/511, 283; 232/43.1, 43.3, 43.4; 312/286, 283, 236, 242; D23/343, 344, 345; 52/27, 36.3

(56) References Cited

U.S. PATENT DOCUMENTS

| | | | | |
|---|---|---|---|---|
| 3,664,325 A | * | 5/1972 | Malafouris | 126/531 |
| 4,136,665 A | * | 1/1979 | Steffen | 126/502 |
| 4,136,762 A | * | 1/1979 | Rosinbaum et al. | 193/34 |
| 4,245,776 A | * | 1/1981 | Miner | 232/43.3 |
| 4,256,083 A | * | 3/1981 | Wilson | 126/516 |
| 4,278,163 A | * | 7/1981 | Tomich | 232/43.4 |
| 4,517,956 A | * | 5/1985 | Baker | 126/283 |
| 4,576,141 A | * | 3/1986 | Lillard | 126/547 |
| 4,787,365 A | * | 11/1988 | Coleman | 126/545 |
| 4,865,016 A | * | 9/1989 | Landry | 126/501 |

FOREIGN PATENT DOCUMENTS

| | | | | |
|---|---|---|---|---|
| FR | 389925 A | * | 5/1908 | 126/283 |
| JP | 3-137424 A | * | 6/1991 | 126/500 |

* cited by examiner

Primary Examiner—Henry Bennett
Assistant Examiner—Josiah C. Cocks
(74) Attorney, Agent, or Firm—C. J. Husar, Esq.

(57) ABSTRACT

The invention relates to a masonry fireplace and a masonry fireplace log box fitted with a door (interior or exterior) or doors (both interior and exterior) that permits firewood to be loaded into the log box without need to carry wood through the interior of the home. Many masonry fireplaces that are constructed in new homes include a built-in log box (or firewood box) as part of the masonry structure. The log box consists of a recessed chamber with sufficient depth to allow a supply of firewood to be stored convenient to the fireplace without need to stack the wood on the hearth or the floor near the fireplace (or stove insert). With the present invention, the firewood is stocked into the log box from the exterior of the home and removed as needed from the interior opening of the log box. In the case of the single interior or exterior door, the door is insulated for energy efficiency and fitted with a locking mechanism to prevent entry by an intruder. For the case where both interior and exterior doors are provided, one door would be insulated and that door or the other would be provided with a locking mechanism. Hinge locations and bolts that attach the door(s) to the masonry structure are also designed to prevent intruder entry. A second embodiment is disclosed wherein the fireplace and the log box are non-masonry pre-asembled units providing the same advantages as the masonry embodiment.

15 Claims, 4 Drawing Sheets

FIREPLACE AND OUTSIDE-LOADING LOG BOX

BACKGROUND OF THE INVENTION

Many masonry fireplaces that are constructed in new homes include a built-in log box (or firewood box) as part of the masonry structure. The log box consists of a recessed chamber with sufficient depth to allow a supply of firewood to be stored convenient to the fireplace without the need to stack wood on the hearth or the floor near the fireplace (or the stove insert). In many homes, the stocking of firewood involves carrying wood through substantial portions of the interior of the home, with the resulting dirt, bark, water, snow or ice littering the floors and carpets. In many home designs that include a fireplace in a formal living room, the provision of a nearby door is not practical. The invention relates to a door or doors that is provided in the masonry structure of the fireplace permitting the log box (or firewood box) to be stocked from the exterior of the log box rear wall. Three door configurations are described: 1) The case where the door is installed in the exterior wall of the fireplace structure and the log box is open to the interior of the house; 2) The case where the door is mounted in the interior wall of the masonry fireplace structure and the log box is open to the exterior of the house. Firewood would be stocked in the log box from the exterior while the interior door is closed and firewood would be removed for use in the fireplace by opening the interior door as needed; and 3) The case where both exterior and interior doors are provided and the log box is stocked with firewood through the exterior door while the interior door remains closed. Similarly, the firewood is removed for use through the interior door while the exterior door remains closed. This "airlock" approach would be particularly appropriate in severe winter climate areas. In all cases, the doors would be sealed with gaskets and insulated for energy efficiency. The door would be sturdy and lockable to prevent unwanted entry.

The invention includes the following features and variations: 1) The case where the door(s) are hinged at the top, bottom, left or right side; 2) The case where the door(s) are split in the middle, hinged on both sides and locked in the middle ("French doors" or double doors); 3) The case where the door(s) are rectangular, square or other shape; 4) The case where the door is drilled and tapped to accept a decorative panel and the case where it is fitted with a decorative panel. Also, the case where the door is painted with a decorative exterior or provided with a decorative decal or other ornamentation.

The invention also includes a second embodiment wherein the fireplace and the log box are non-masonry units and wherein a common building extension is provided as an enclosure for each of these units which may be a pre-assembled non-masonry fireplace and a pre-assembled log box frame which receives pre-hung doors at either or both ends of said log box frame for permitting exterior loading and interior unloading as desired.

DESCRIPTION OF PRIOR ART

A search of the issued United States Patents reveals the following inventions relating to devices for passing firewood through the wall of the residence: U.S. Pat. No. 4,278,163 discloses a wall-mounted chute that utilizes a hinged "V" shaped hopper that pivots between an external horizontal opening (with door) and an interior opening, also horizontal. Unlike the instant invention, this invention is not an integral part of the fireplace structure and does not use vertical doors mounted on the interior and/or exterior of the fireplace structure. Further, the instant invention does not utilize a moving or pivoting hopper, but allows the firewood to be placed into a fixed log box.

U.S. Pat. No. 4,136,762 discloses a log dispenser that has both an interior log box and an exterior log box. By virtue of a sloping or "inclined" floor connecting the interior and exterior portions of the dispenser, logs "roll" from the exterior chamber to the interior chamber as logs are removed for use. The current invention does not employ inclined floors, nor does it rely on gravity and firewood that has a round or near-round cross-section for the firewood to "roll" from an exterior chamber to an interior chamber. The present invention does not include an exterior log box and does not utilize a bell crank or lifting arm to actuate the door.

U.S. Pat. No. 4,517,956 discloses a track-mounted, moveable log box that is secured to an opening in the exterior wall of the building. The log box is loaded with firewood through a horizontal top opening door while the box is in a position outside the building. The loaded log box is then pushed through an opening in the wall on its track and the firewood is subsequently removed through the same horizontal door. The current invention utilizes a fixed log box (rather than moveable log box) which is an integral part of the fireplace structure and vertical door(s) for loading and unloading firewood. The log box does not move from the interior to the exterior of the building or vice versa.

U.S. Pat. No. 4,245,776 discloses a pass-through drawer for passing food or other items through the wall to the exterior of a building. The invention includes a mechanically-actuated, sliding floor to move the item to the exterior position. The invention does not incorporate a storage area, but rather is intended for moving individual items through the wall for immediate removal. The current invention does not utilize a sliding floor and does include an integral storage volume (log box) so that the firewood can be removed, as needed, over a long period of time.

In view of the many deficiencies of the prior art as outlined above, applicant has designed a unique fireplace/log box arrangement wherein firewood can be loaded into a log box from the exterior of the building and readily removed therefrom in the interior of the building in a convenient and debris free manner.

OBJECTS OF THE INVENTION

An object of the invention is to provide a masonry fireplace and a built-in masonry log box wherein the log box is provided with an exterior access door for loading thereof.

A further object of the invention is to provide a masonry fireplace and a built-in masonry log box wherein the door controlling access to the log box is an interior door located at the front of the log box.

Another object of th invention is to provide a masonry fireplace and a built-in log box wherein the log box is provided with a pair of access doors for loading the log box, i.e. an exterior door and an interior door.

Yet another object of the invention is to provide a masonry fireplace and a built-in masonry log box wherein access doors are provided with appropriate sealing and security features to prevent unwanted access.

A still further object of the invention is to provide a non-masonry pre-assembled fireplace and a built-in pre-assembled non-masonry log box having various interior and exterior door combinations as set foth above.

A final object of the invention is to provide a masonry fireplace and a built-in masonry log box which is inexpensive, convenient to use and provides an enjoyable fireplace using experience.

These and other objects of the invention will become more readily apparent upon further review of the following specification and drawings.

BRIEF DESCRIPTION OF THE DRAWINGS

Various other object and features and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

While the above embodiments of the invention have been described and illustrated, it will be understood by those skilled in the art that changes and modifications may be resorted to without departing from the spirit and scope of the invention.

Figure 1:
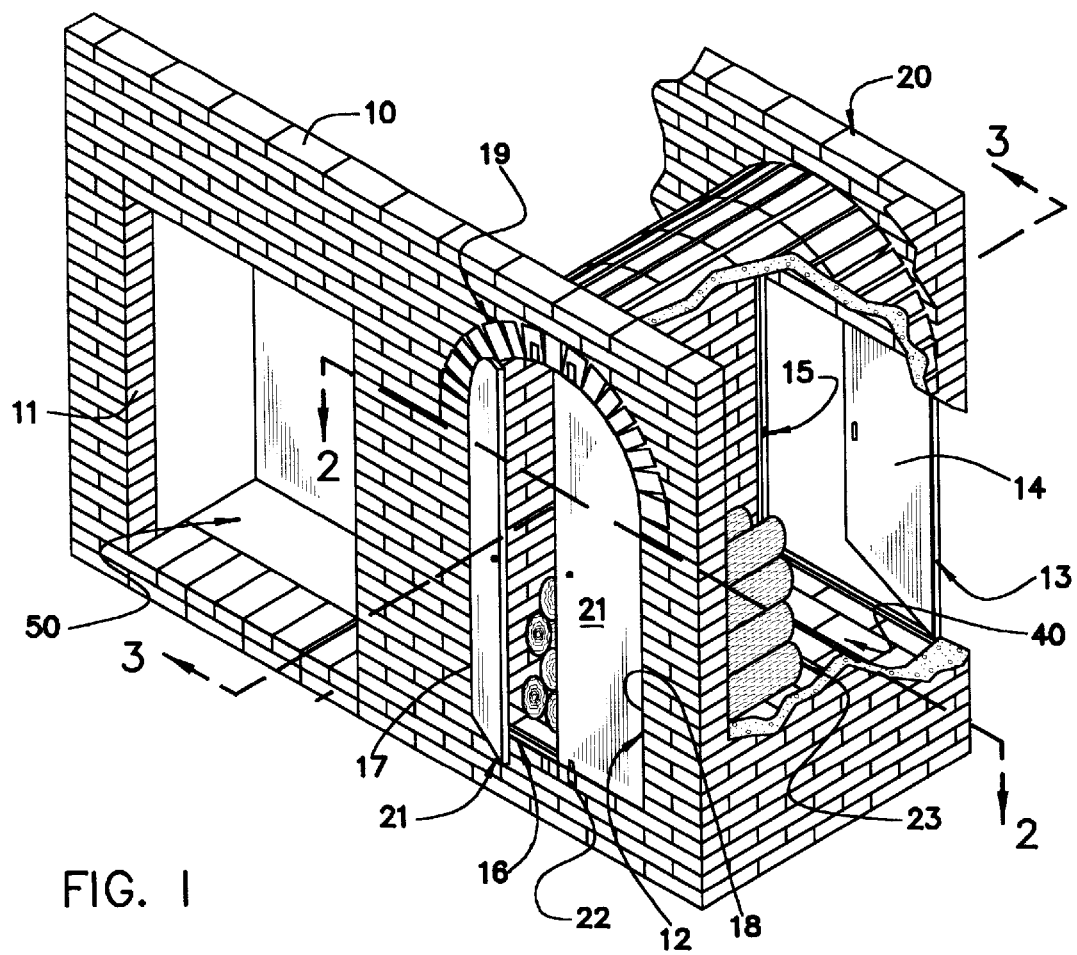
FIG. 1 is a perspective view of a masonry fireplace and an adjacent built-in masonry log box in partial section with access doors located at the front and rear of the log box.

Referring now to FIG. 1, there is shown a perspective partially cut-away view illustrating a masonry fireplace 50 extending inwardly from a first opening 11 in frontal masonry wall 10 which is located in the interior of a residential room. Spaced from frontal wall 10 and parallel thereto is an exterior wall 20 which is part of the exterior masonry forming the fireplace chimney. Frontal masonry wall 10 is provided with a second opening 12 which extends rearwardly to an aligned third opening 13 in exterior masonry wall 20 which receives a pre-hung frame 13 and rear door 14 for controlling access to log box 40. Rear door 14 is provided with lockable latching means 15 for protection against unauthorized entry. Second opening 12 has a base 16, a pair of opposing side walls 17 and 18 which are capped by decorative arch 19. Received in second opening 12 are prehung doors 21 and frame 26 which include latching means 22 for securement of doors 21. The log box chamber 40 is formed by base or floor 16, side walls 17, 18 and arched overhead 19 for holding a plurality of logs 23 for future use.

Figure 2:
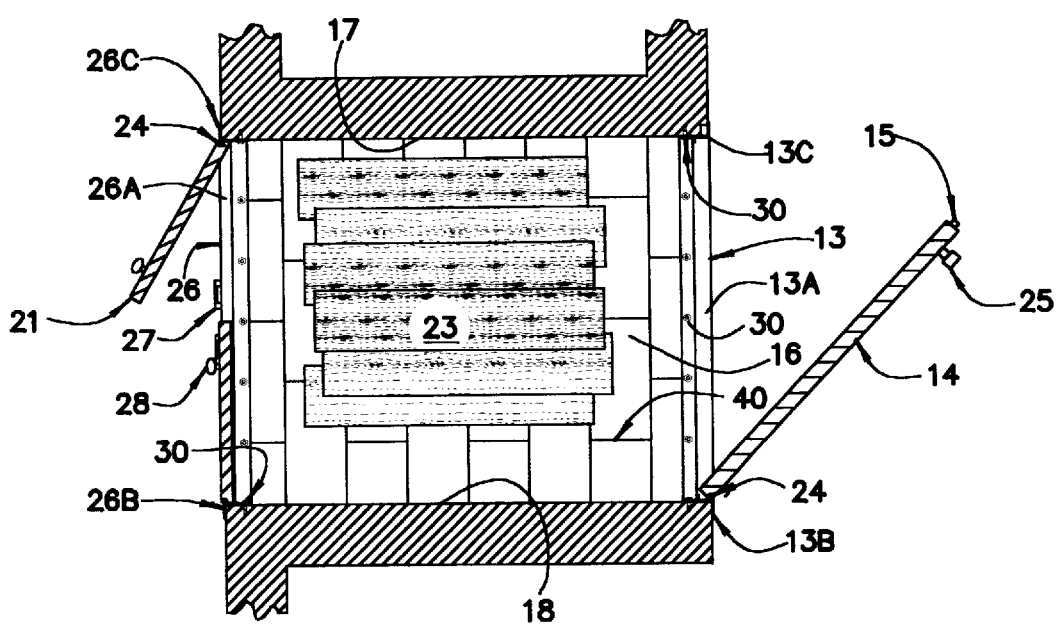
FIG. 2 is a horizontal sectional view taken along the plane 2—2 of FIG. 1, showing the built-in log box and the locations of the access doors.

Turning now to FIG. 2, there is shown a horizontal sectional view looking down into log box 40 wherein pre-hung frame 13 for rear door 14 is comprised of a plurality of angle iron type members 13A, 13B, 13C with one leg overlapping the exterior brickwork and the other leg anchored on the inside by a plurality of lag bolts 30. A fourth frame member 13D is not visible in this view. Rear door 14 is provided with a plurality of hinges 24 and a lockable handle 25 which controls latch 15.

Front doors 21 are similarly mounted in front opening 12 by a pre-hung door frame 26 comprising a base member 26A, a pair of side members 26B, 26C and a fourth top member 26D not visible in this view. Latch means 27 and handle 28 complete the arrangement for front doors 21. Although double doors 21 are shown along with rear door 14, optionally rear door 14 could be eliminated, leaving only front doors 21, in which case doors 21 would be adequately sealed to prevent unwanted draft leakage through the doors. Another option would be to eliminate front doors 21, leaving only rear door 14 to control access, in which case rear door 14 would be adequately sealed to prevent air leakage therearound.

Figure 3:
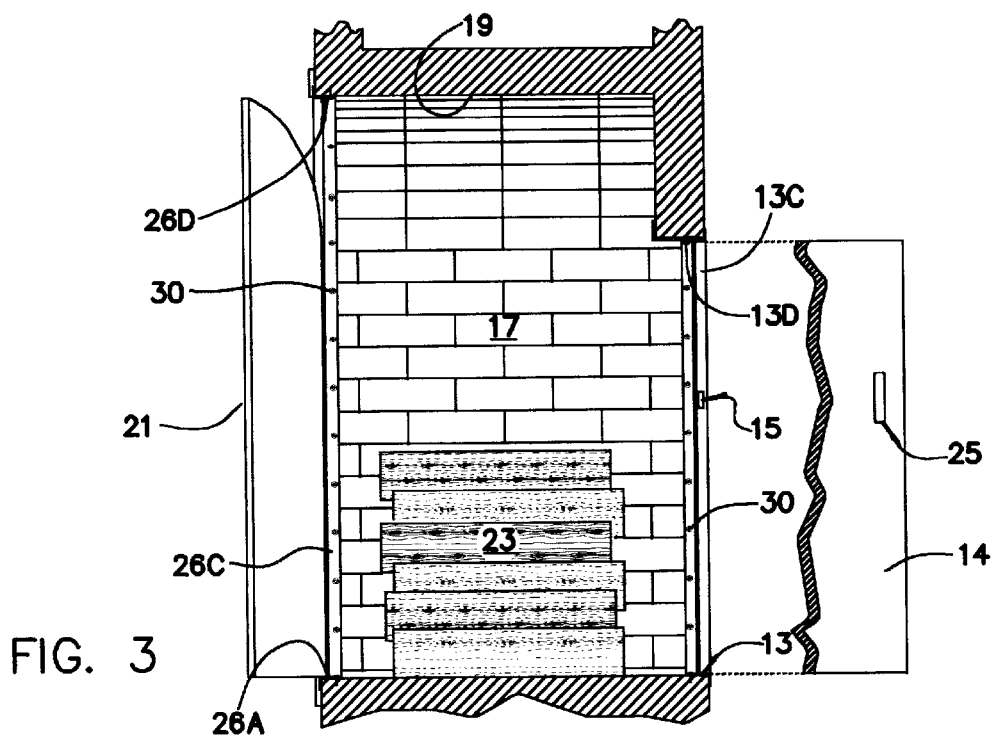
FIG. 3 is a vertical sectional view taken along the plane 3—3 of FIG. 1, illustrating the interior of the log box with both the front and rear doors in the open position.

Referring now to FIG. 3, there is shown a vertical sectional view taken through the center of log box 40 wherein one of the front doors 21 is open and rear door 14 is also open and partially illustrated, Left side wall 17 and arched overhead 19 are also partially shown. Left frame member 26C is shown attached to side wall 17 by means of anchors 30 and base frame member 26A is shown secured to the masonry floor. Left frame member 13C for rear door 14 is also shown anchored to side wall 17 by lag bolts 30.

Figure 4:
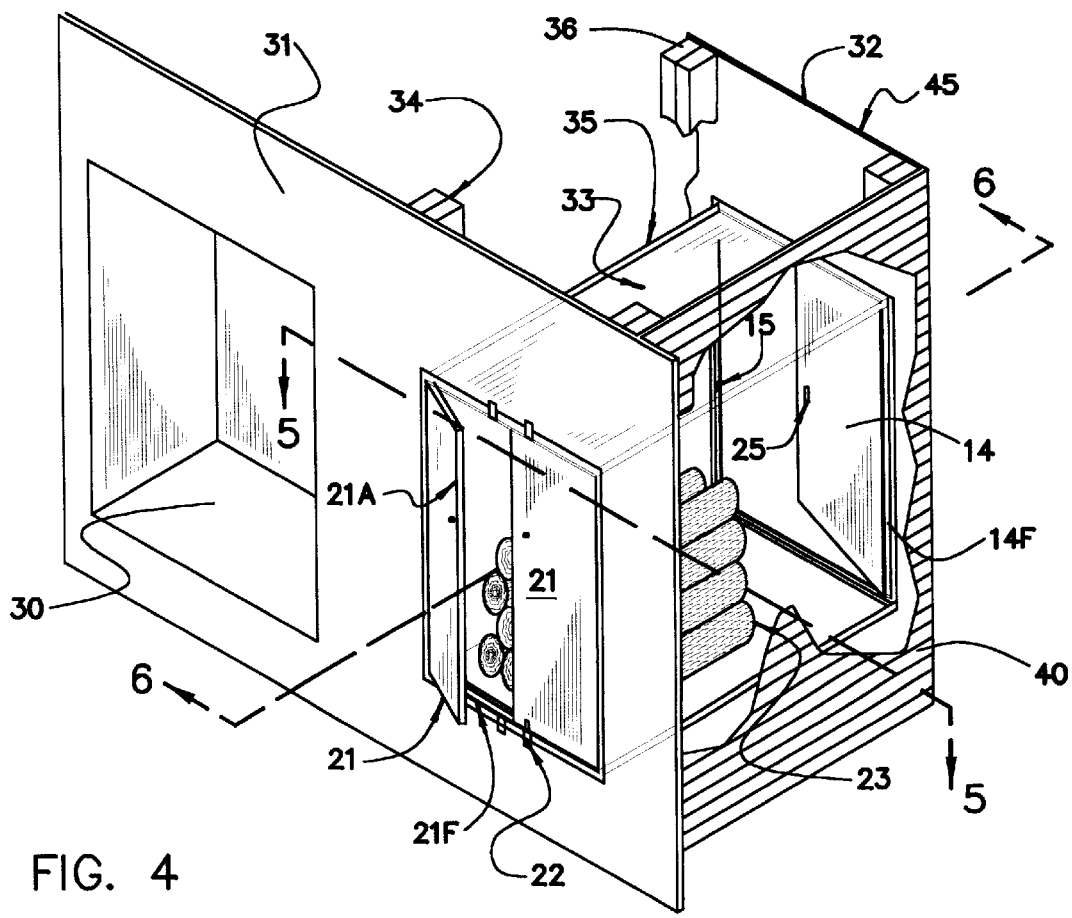
FIG. 4 is an illustration of the non-masonry embodiment showing the pre-assembled fireplace and log box with side of the log box omitted to show the interior thereof.

Referring now o FIG. 4, there is shown another embodiment of the fireplace and log box arrangement of FIGS. 1–3, in this embodiment prefabricated or pre-assembled fireplace and log box units are utilized. In this view, log box 33 is constructed of metal, fiberglass or other rigid material other than masonry and is enclosed in an extension 45 which extends rearwardly and outwardly form the building structure. Wood framing members 34 and 36 are used in forming extension 45. Exterior siding 40 constructed of wood, aluminum siding or other exterior building material finishes off the exterior of extension 45. Positioned within extension 45 is log box frame 35 which is welded or bolted to interior and exterior door frames 21F and 14F, respectively, which are in turn, secured to front and rear framing members 34 and 36 by screws or bolts 37 or other appropriate securing means. Firewood 23 is stacked into log box 33 through rear exterior door 14 and subsequently removed as needed, through interior door/doors 21. The hinged exterior door 14 is fitted with a locking mechanism 15 and hinged interior doors 21 are provided with latches 22 and knobs or handles 21A for opening and closing same.

Figure 5:
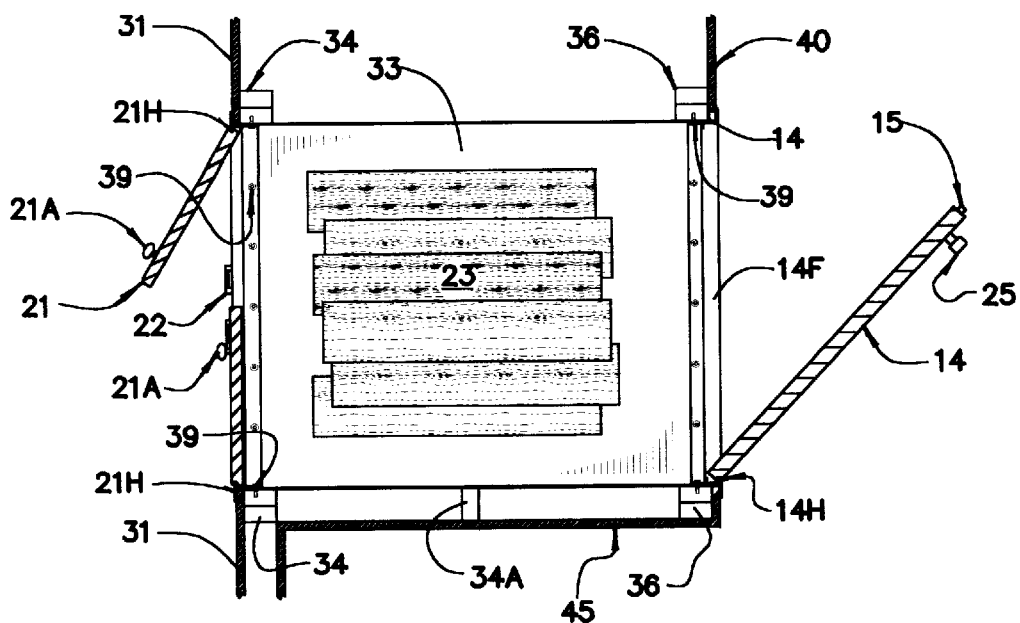
FIG. 5 is a horizontal sectional view taken along the plane 5—5 of FIG. 4, illustrating the log box and its relation to the framing members.

Turning now to FIG. 5, there is shown a horizontal sectional view looking down into log box 33 which is formed by frame 35. Log box frame 35 is supported by a plurality of framing members 34, 34A, 36, 37, 38 which provide additional support for interior door frame 21F and exterior door 14F to allow pivotal movement of the doors thereon. Latches 22 secure interior doors 21 while lockable latch 15 secures exterior door 14.

Figure 6:
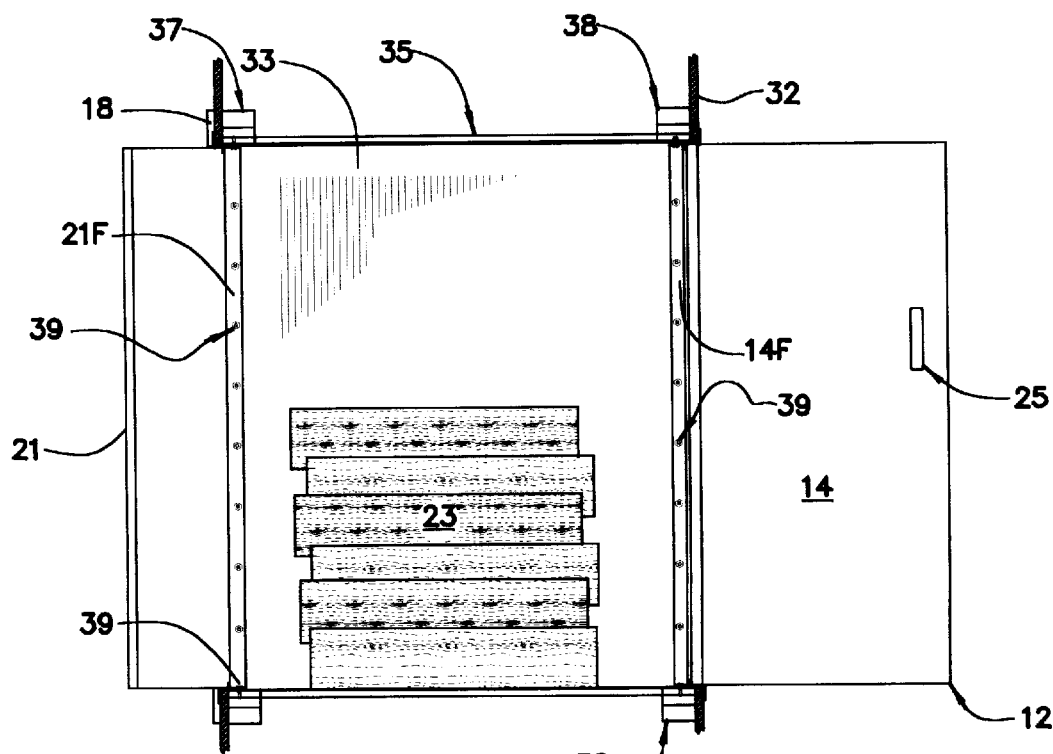
FIG. 6 is a vertical sectional view taken along the plane 6—6 of FIG. 4, illustrating the non-masonry log box and its supporting members with the rear and one of the front doors open.

FIG. 6 is a vertical sectional view taken along the plane 6—6 of FIG. 4 illustraing log box 33 with exterior door 14 and interior door 21 in their open position. Additional framing members 37 and 38 are shown providing additional support to log box 35.

Figure 7:
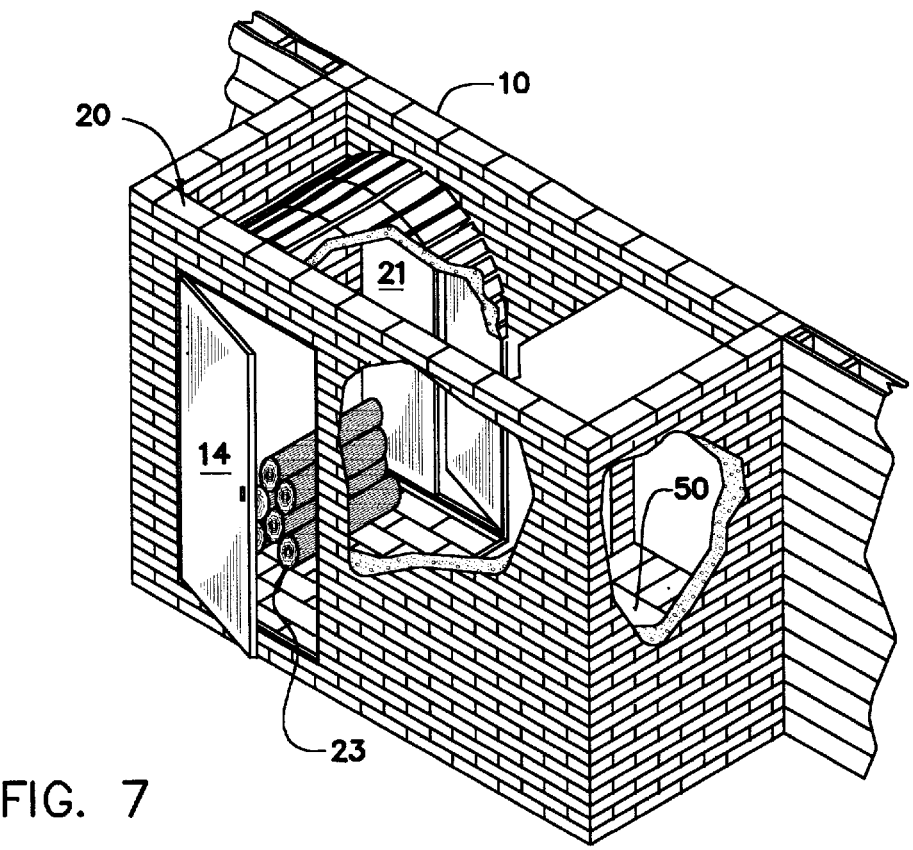
FIG. 7 is a perspective illustration of masonry embodiment showing the exterior of the residence, fireplace chimney and the log box access door.

FIG. 7 is an exterior illustration of the masonry fireplace and masonry log box showing how they tie-in exteriorly with the fireplace chimney.

Figure 8:
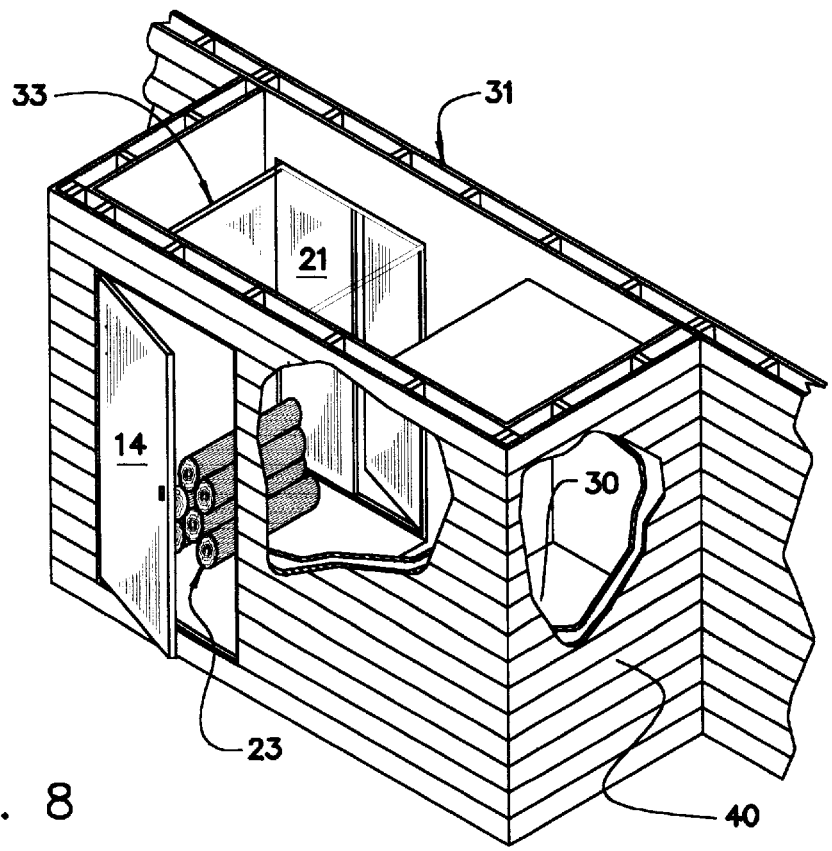
FIG. 8 is an illustration of the non-masonry embodiment showing the exterior extension which encloses the pe-assembled fireplace and pre-assembled log box.

FIG. 8 is an illustration of extension 45 for the non-masonry fireplace and non-masonry log box showing its relation to the remainder of the building structure.

While the embodiments of the invention have been described and illustrated in their preferred embodiments, it will be understood by those skilled in the art that changes and modifications may be resorted to without departing from the true spirit and scope of the invention.

Having thus described my invention, I claim:

1. The combination of a residential building structure having a masonry fireplace and a built-in masonry log box comprising:

a frontal masonry wall structure located in the interior of said residential building structure;

a rear masonry wall structure spaced from said frontal masonry wall structure in parallel relation thereto and located exterior of the building structure;

a first opening extending inwardly from said frontal masonry wall having two side walls, and a rear wall forming a firebox;

a second opening adjacent to said first opening also extending inwardly from said frontal masonry wall structure;

a third opening in said rear masonry wall axially aligned with said second opening and forming a log box therebetween for storage of firewood; and hinged closure means operably connected to both of said second and third openings to provide log box access whereby firewood can be loaded into said log box from the exterior of said residential building structure and accessed for use in the interior of said residential building structure thus eliminating the need for carrying firewood through the interior of said building structure with its attendant disadvantages.

2. The combination of a residential masonry fireplace and a built-in masonry log box as described in claim 1 wherein said log box is located to the right of said fireplace.

3. The combination of a residential masonry fireplace and a built-in masonry log box as described in claim 1 wherein said log box is located to the left of said fireplace.

4. The combination of a residential masonry fireplace and a built-in masonry log box as described in claim 1 wherein said closure means comprises a pre-drilled door frame mounted in at least one of said second and third openings for receiving closure means to control access to said log box.

5. The combination of a residential masonry fireplace and a built-in masonry log box as described in claim 4 wherein said closure means comprises a lockable hinged security door attached to said pre-drilled door frame located in said rear masonry wall structure at the rear of said log box to provide access to the interior therof.

6. The combination of a residential masonry fireplace and a built-in masonry log box as described in claim 4 wherein said closure means comprises a lockable hinged security door attached to said pre-drilled door frame located in said frontal masonry wall structure at the front of said log box to provide access to the interior thereof.

7. The combination of a residential masonry fireplace and a built-in masonry log box as described in claim 4 wherein said closure means comprises a first weatherproof hinged security door attached to said pre-drilled door frame and located in said rear masonry wall structure to allow access to the interior of said log box and a second interior hinged decorative door attached to said pre-drilled door frame mounted in said frontal wall structure to allow access to said log box whereby logs can be accessed for use in said firebox.

8. The combination of a residential building structrue having a masonry fireplace and a built-in masonry log box as described in claim 7 wherein said second interior hinged decorative door in said frontal wall structure is of greater length than said first waterproof hinged security door.

9. The combination of a residential building structure having a separate non-masonry, pre-assembled firebox and a separate non-masonry pre-assembled log box comprising:

an extension extending from said residential building structure to provide an enclosure for said non-masonry firebox and said non-masonry log box;

said extension leading from an interior wall with an exterior rear wall spaced therefrom, two side walls and a roof portion;

a first opening in said interior wall containing said non-masonry pre-assembled firebox;

a second opening in said interior wall horizontally spaced from said first opening and an aligned third opening in said exterior rear wall for receiving said pre-assembled log box frame therein;

said pre-assembled log box frame having a plurality of joined framing members forming a log box with axially aligned front and rear openings at opposite ends thereof located in juxtaposition to said second and third openings, respectively, with hinged closure means located in at least one of said aligned front and rear openings for providing access to said log box whereby firewood can be loaded into said log box from the exterior of said residential structure thus eliminating the need to carry firewood through the interior of said residential structure with its attendant disadvantages.

10. The combination of a residential building structure having a non-masonry fireplace and a non-masonry log box as described in claim 9 wherein said pre-assembled log box frame comes in kit form and is assembled prior to insertion into said second opening of said interior wall.

11. The combination of a residential building structure having a non-masonry fireplace and a non-masonry log box as described in claim 9 wherein said hinged closure means comprises a hinged weatherproof door located in said outer opening of said pre-assembled log box with said inner opening remaining open to provide access to said log box from the interior of said residential building structure;

said hinged waterproof door having appropriate latching and locking means to prevent unauthorized access.

12. The combination of a residential building structure having a non-masonry firebox and a non-masonry log box as defined in claim 9 wherein said hinged closure means comprises a hinged weatherproof door located in said front opening of said pre-assembled log box and said rear opening remaining open to provide access to said log box allowing loading from the exterior of said residential building structure.

13. The combinaton of a residential building structure having a non-masonry firebox and a non-masonry log box as defined in claim 9 wherein said hinged closure means comprises a hinged waterproof security door located in said rear opening of said pre-assembled log box and a decorative designer insulated door located in said front opening of said pre-assembled log box whereby said log box can be loaded from the exterior of residential structure and access to said log box is permitted through said decorative designer insulated door thus eliminating the usual debris problems associated with fireplace use.

14. The combination of a residential building structure having a non-masonry firebox and a non-masonry log box as defined in claim 9 wherein said non-masonry firebox and said non-masonry log box frame are pre-assembled welded metal units.

15. The combination of a residential building structure having a non-masonry firebox and a non-masonry log box as defined in claim 9 wherein said non-masonry log box frame comprises a plurality of pre-assembled bolted frame members with said front and rear opening frame members having pre-drilled holes for selective attachment of said closure means.

* * * * *